3,441,855
Patented Apr. 29, 1969

3,441,855
HIGH FREQUENCY WATTMETER EMPLOYING INDUCTIVE SHIELDING AND A CAPACITIVE SHUNT FOR FREQUENCY COMPENSATION
Yoshikazu Aida, Tokyo-to, and Toshizo Kakizawa, Yokohama-shi, Japan, assignors to Agency of Industrial Science and Technology, Ministry of International Trade and Industry, Chiyoda-ku, Tokyo-to, Japan, an authority of the Japanese government
Filed Sept. 22, 1964, Ser. No. 398,283
Claims priority, application Japan, Sept. 30, 1963, 38/51,759
Int. Cl. G01r 5/26, 27/02
U.S. Cl. 324—106                    1 Claim

ABSTRACT OF THE DISCLOSURE

The invention relates to a high frequency thermocouple wattmeter of load type employinng a resistance load which comprises a plurality of parallel resistance elements and a thermocouple connected to the resistance load to measure the power dissipated therein. Electromagnetic shielding means are disposed about the thermocouple to reduce inductance coupling between the thermocouple and the other members. Compensating means in the form of at least one of the following: a capacitor, inductor, combination of a capacitor and inductor and parallel resistor are provided to compensate for the current flowing through the resistance load adjacent the junction between the thermocouple and the resistance connected to the thermocouple. Thus, the electric power consumed between resistance load and the thermoelectromotive force remain in a constant state regardless of frequency.

---

This invention relates to a super-wide range, high accuracy, high frequency wattmeter and more particularly to an improved wattmeter which can measure electric power with high accuracy over an extremely wide frequency range including direct-current and high-frequency power up to 500 mc.

Heretofore, there have been used many types of load-type, high-frequency wattmeters of relatively large capacity including a type wherein electric power supplied to a load is indicated by a combination of a current transformer and a thermocouple, a type wherein the voltage at the input terminal of a load is rectified by means of a diode to indicate the electric power, and similar other types. In the former arrangement which uses a current transformer, the frequency band is very narrow so that the frequency ratio is usually of the order of about 1.5; while in the latter arrangement utilizing a diode or a rectifier, the frequency band is broad, but the results of measurement are liable to be affected by the waveform of signals, humidity and temperature, and the like environmental conditions so that this arrangement has poor reproducibility and poor stability over short intervals of time.

This invention contemplates the elimination of the above-mentioned defects of the prior art devices, and has as its principal object the provision of a novel load type high frequency wattmeter which provides accurate measurements over a very wide frequency range without being affected by such factors as frequency, temperature, humidity, and the like.

In order to attain the above and other objects, this invention provides a wide range, high accuracy, high frequency wattmeter of the load type comprising a resistance load member, a thermocouple connected to said resistance load member to measure current, said thermocouple being of a high frequency insulation type and being electromagnetically shielded, and means to compensate for the current flowing through said resistance load member by means of a capacitance, inductance, a distributed constant circuit equivalent to said capacitance or inductance, or combinations thereof, thereby to maintain constant or substantially constant the electric power consumed by said load resistance member and the thermoelectromotive force of said thermocouple, irrespective of the frequency.

Figure 1:
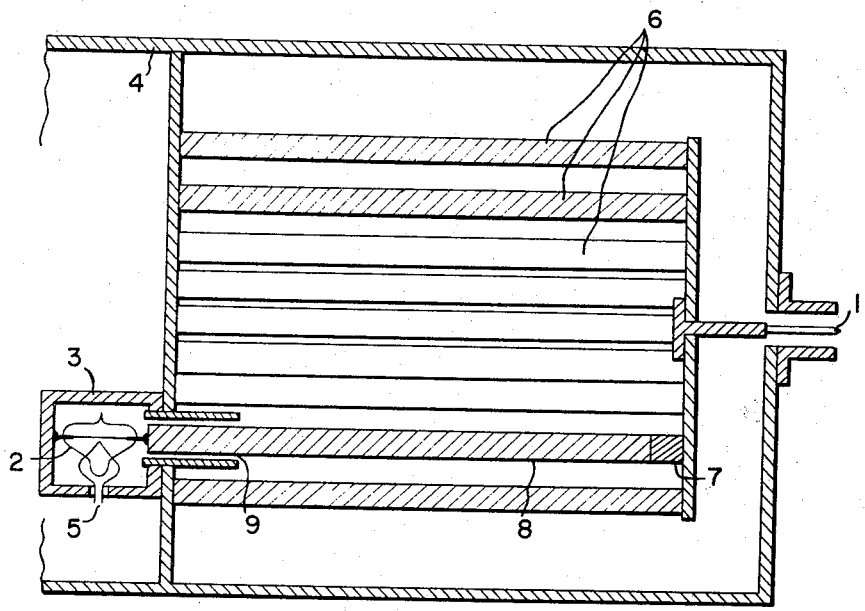
Figure 2:
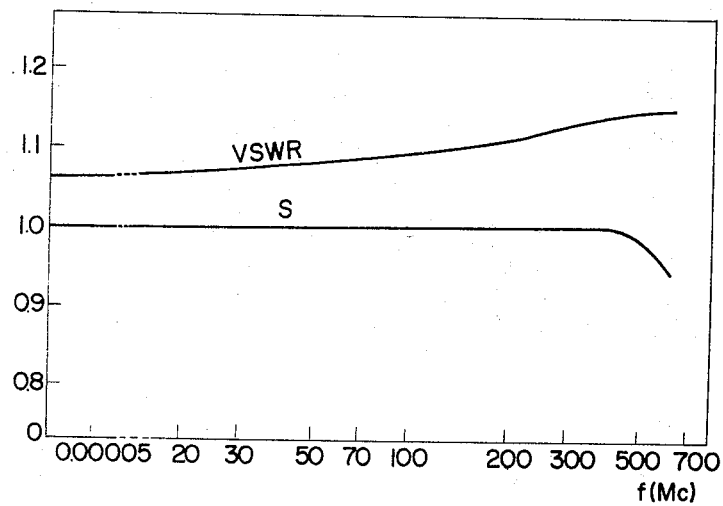

The features of the invention which are believed to be novel are set forth with particularity in the appended claim. The invention itself, however, as to its organization together with further objects and advantages thereof, may best be understood by reference to the following description taken in connection with the accompanying drawings in which:

FIG. 1 is a schematic sectional view of a wattmeter embodying this invention to illustrate the relative arrangement of circuit components, and FIG. 2 is a graph illustrating the frequency characteristics of a wattmeter embodying this invention.

Referring now to FIG. 1 of the accompanying drawings, there is shown a longitudinal section of a high frequency wattmeter comprising an input terminal 1, a thermocouple unit 2 provided with a high frequency insulation contained in a metal casing 3 adapted to shield electromagnetically the thermocouple unit, an outside conductor 4, output leads 5 to which to connect an instrument for measuring the thermoelectromotive force of the thermocouple, a plurality of high frequency resistance elements 6 which are arranged in one or more rows circumferentially around the axis of the input terminal 1, a metal rod 7, a resistance element 8 connected between the metal rod and the thermocouple unit 2, and a reactance (capacitance, for example) compensating for element 9.

In the preferred embodiment shown in FIG. 1, a compensating artificial load type resistance element comprisinng a plurality of parallel connected high frequency resistance elements is utilized, and a thermocouple unit having an electromagnetic shield and a high frequency insulation is connected in series with one of said resistance elements. Thus, the construction of the wattmeter is very simple, and it will be obvious that the high-frequency power consumed by the wattmeter is substantially equal to the result obtained by integrating along the axis of the respective resistance elements the product of the square of conduction current axially flowing through the elemental portion thereof and the resistance of said elemental portion and summing up the integrated values of all resistance elements.

It is to be understood that the wattmeter of this invention is so constructed that the electric power consumed by said resistance elements and an output consumed by the thermocouple unit and developed as a thermoelectromotive force are maintained constant irrespective of the frequency, whereby a power-frequency characteristic which is better than the impedance-frequency characteristic of the load is provided.

Considering these more in detail, the thermocouple utilized in this invention is characterized in that it comprises an insulated type high-frequency current measuring thermocouple which is completely shielded electromagnetically or shielded to provide an equivalent effect thus decreasing the inductive impedance thereof. Moreover, one terminal of the thermocoupl- unit is grounded or connected to the outside conductor, while the other terminal is connected to a resistance element 8, and a reactance compensation element 9 is provided at or near, i.e., adjacent to the junction between the thermocouple unit and the resistance element 8 by means of a capacitance, inductance or combination thereof thereby to provide a uniform frequency-power characteristic.

As a capacitance for effecting capacitive reactance compensation, a lumped additional capacitance, or a distributed constant type capacitance comprising a resistor and a conductor, or a resistance element 8 which is displaced from an array of the several other resistance elements 6 to come into alignment with the thermocouple, as shown in FIG. 1, for example, may be utilized.

For theoretical analysis of the present wattmeter wherein the thermoelectromotive force of the thermocouple has a definite, i.e., substantially constant, relation to the power consumed by the entire load irrespective of the frequency, an electromagnetic wave analysis, strictly speaking, is necessary, but in practice, it can be derived from a theoretical consideration of distributed constants. To illustrate one solution of compensation available in practical design, a method of treating lumped contents will be described hereinbelow. It is assumed here that R and L represent respectively the equivalent resistance and inductance near the thermocouple, that C represents the equivalent capacitance near the input of the thermocouple, and that the input voltage to standing wave ratio of the load resistance is made to be one (unity) regardless of the frequency, and if the resonance frequency as determined by the inductance L and the capacitance C is made sufficiently high with respect to the frequency employed, as in the case of a well-known compensating resistance, the following equation of approximation can be obtained.

$$\sqrt{\frac{2L}{C}} \doteq R \quad (1)$$

As a result, a wattmeter having a constant sensitivity to power over a range from direct current to a substantially high frequency can be obtained by forming a circuit arrangement which is equivalent to said result from the standpoint of distributed constants. Further information may be obtained from the following reference: "Theory and Application of Microwaves," by A. B. Bronwell and R. E. Beam, copyright 1947, McGraw-Hill Book Company Inc. Note particularly Formula S or FIG. 7 at 8.07.

It will be obvious that, for the load resistance of the wattmeter, in addition to a load resistance comprising a plurality of resistance elements as shown in FIG. 1, any suitable resistor such as a single coaxial resistor, an exponential resistor, tractorial resistor, or the like may be applied. With regard to the treatment utilizing distributed line constants, when using an ordinary type coaxial resistor wherein the external conductor and the resistance element are maintained at a fixed relation along the axis, if it is assumed that $I_1$ represents a current that flows through a portion which interconnects the resistance element and the external conductor, and that $I_0$ represents the current flowing into the input end of the resistance element, the ratio between these currents may be expressed as follows by taking into consideration the distribution constants, provided that the wave length $\lambda$ is sufficiently longer than the length $l$ of the resistance element.

$$\frac{I_1}{I_0} = 1 + k\left(\frac{2\pi l}{\lambda}\right)^2 \quad (2)$$

The value of $k$ may be selected to be about 0.4 where $l$ is less than a fraction of $\lambda$. Thus, with regard to the electric power consumed by all of the resistance elements, it is possible to provide a power sensitivity which is substantially independent of frequencies by making nearly equal the increment of the thermoelectromotive force of the thermocouple and the increment of the current flowing through said resistance elements. For the current following through the thermocouple, it is sufficient to limit its increment to about 50% of the increment of the current flowing through the resistance elements or about $$0.2\left(\frac{2\pi l}{\lambda}\right)^2$$

Such a circuit arrangement can be realized relatively easily by employing either a suitable combination of lumped constant circuit elements or a distributed constant circuit. Equation 2, as well as the other considerations, is generally applicable to the array of resistance elements as shown in FIG. 1.

With regard to the operation and merits of this invention, reference should be had to FIG. 2 which illustrates an example of test results of a wattmeter, embodying this invention, made in order to determine its impedance and power sensitivity-frequency characteristics. The ordinate represents the values of the ratio VSWR between the load resistance or the power sensitivity S and the voltage standing wave, while the abscissa represents the frequency $f$ in megacycles. The power sensitivity S was measured by directly operating a meter by the thermoelectromotive force of the thermocouple. While this sensitivity curve is fairly flat over a very wide range from 0 (or direct current) up to about 500 mc., the flatness can be further improved with an appropriate compensation. As can be seen from FIG. 2 it is to be particularly noted that the power sensitivity characteristic S is sufficiently better than the impedance characteristic in the region up to approximately 400 mc.

From the above description it will be noted that the novel wattmeter has superior characteristics which make it possible to effectively indicate the effective value of the power over a very wide frequency range from direct current up to a high frequency of 500 mc. In addition thereto, the novel wattmeter has the following merits in its characteristics as well as in practical use when compared with the prior art wattmeters of various types.

(1) It is substantially free from the effect of waveforms.

(2) It is extremely insensitive to variations in humidity and temperature.

(3) It can be easily calibrated with direct current or commercial frequency alternating current, of say, for example, 50 cycles per second.

(4) It is extremely stable, and a reproducibility of 0.5% was noted over a very long period.

(5) Its circuit arrangement is very simple.

(6) Its weight is very low, so that it is convenient to handle.

Having such features as enumerated above, the novel wattmeter can be advantageously used in various applications such as measurements of outputs from transmitters and radioheaters and maximum output of transmitter vacuum tbes and other applications where direct reading with high accuracy of electric power is desired. Moreover, once the wattmeter is calibrated by means of a high accuracy standard wattmeter it can be used as a practical standard over many years.

What is claimed is:

1. A high frequency thermocouple wattmeter of the load termination type comprising, in combination, a resistance load member consisting of a plurality of parallel resistance elements having lengths shorter than the wave length of the frequency of the input power being measured; a thermocouple unit having a heater resistance wire connected in series with one of said resistance elements and having a thermocouple element adjacent to the heater wire to detect dissipated power; meter means coupled across the output of the thermocouple to provide a power reading; electromagnetic shielding means encompassing said thermocouple unit to reduce the inductance effect thereof and any change in current in the heater wire with change in frequency by reducing inductive coupling between said thermocouple heater resistance wire and the resistance load member; and compensating means consisting of a capacitive reactance element mounted in capacitive relation to said parallel resistance elements and adjacent to the connection between said thermocouple heater resistance wire unit and resistance element; said capacitive reactance element acting to increase, with the increase of frequency of the input power, the shunt current past the heater resistance wire, thereby to maintain the thermocouple unit current constant with a change of frequency of the current for a given power input level to compensate increase of the inductance effect of the thermocouple with increase in frequency, thus causing substantially constant relationship of the output of the thermocouple to the power being measured irrespective of the frequency of the current applied to the resistance load member.

References Cited

UNITED STATES PATENTS

| | | | |
|---|---|---|---|
| 2,131,101 | 9/1938 | Ferris | 333—81 |
| 2,387,158 | 10/1945 | Kozanowski | 324—106 XR |
| 2,468,775 | 5/1949 | Ovrebo | 324—106 XR |
| 3,128,428 | 4/1964 | Lush | 324—106 XR |

RUDOLPH V. ROLINEK, *Primary Examiner.*

E. F. KARLSEN, *Assistant Examiner.*

U.S. Cl. X.R.

324—95